UNITED STATES PATENT OFFICE.

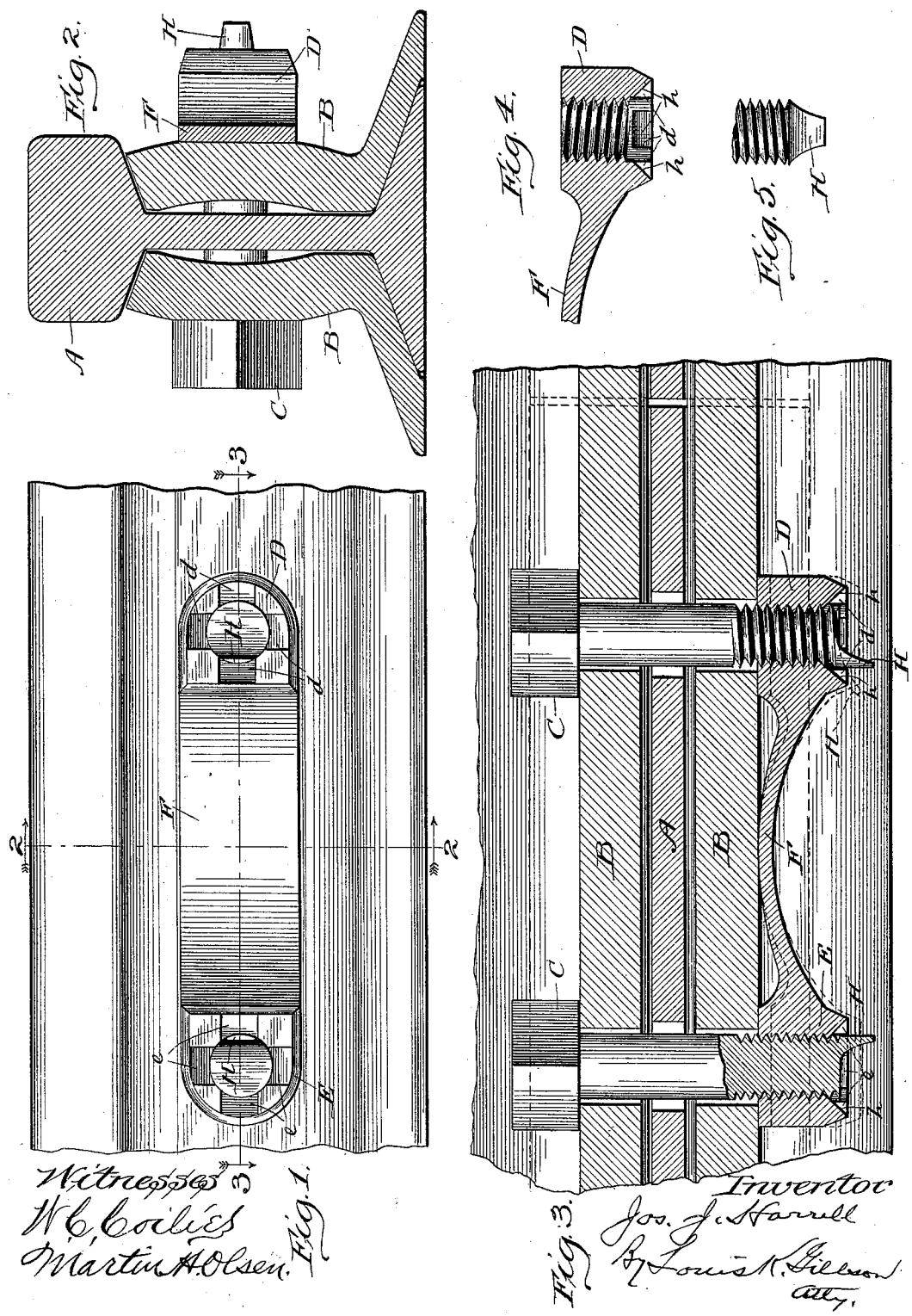

JOSEPH J. HARRELL, OF CHICAGO, ILLINOIS, ASSIGNOR TO ERNEST DALE OWEN, TRUSTEE, OF SAME PLACE.

BOLT AND NUT.

SPECIFICATION forming part of Letters Patent No. 614,169, dated November 15, 1898.

Application filed March 12, 1898. Serial No. 673,588. (No model.)

*To all whom it may concern:*

Be it known that I, JOSEPH J. HARRELL, a citizen of the United States of America, and a resident of Chicago, county of Cook, and State of Illinois, have invented certain new and useful Improvements in Bolts and Nuts Therefor, of which the following is a specification, and which improvements are fully illustrated in the accompanying drawings, forming a part of such specification.

The objects of the invention are to provide a cheap and efficient construction for bolts and nuts, particularly as adapted for use in connection with railroad construction and for attaching fish-plates to rails.

The invention consists in a pair of bolts, which may be provided at their threaded ends with longitudinally-projecting lugs adapted to be turned over radially, a nut-strap having threaded apertures at its ends for receiving the ends of the bolts, and an elastic bowed body adapted to bear against the fish-plate and normally hold the apertured ends away therefrom, the ends of the strap having radial recesses at the outer ends of their apertures into which the lug of the bolt may be forced.

In the accompanying drawings, Figure 1 is a side elevation of a portion of a railway-rail and fish-plate, the latter being secured by means of my improved bolts and strap-nut, this figure showing an elevation of the strap-nut and the threaded ends of the bolts. Fig. 2 is a sectional view on the line 2 2 of Fig. 1. Fig. 3 is a sectional view on the line 3 3 of Fig. 1. Fig. 4 is a detail section of one of the ends of the nut-strap, taken on the line 3 3 of Fig. 1; and Fig. 5 is a detail side elevation of the threaded end of one of the nuts.

I show a portion of an ordinary T-rail at A, at B B a pair of fish-plates, at C C the heads of a pair of bolts, at D E the apertured ends of the nut-strap, and at F the body portion of the strap.

The bolts C C are provided with screw-threads, and from the threaded end of each and from the periphery of the bolt there projects a lug H, which is adapted to be overturned radially as to the bolt by the blow of a hammer. The ends of the nut-strap are thickened, so as to provide ample stock, and the outer faces of these end portions are provided with a plurality of recesses d e, extending radially from the threaded apertures, the bottoms of these recesses being inclined outwardly, as shown at h h.

The body portion F of the nut-strap is bowed inwardly, normally extending beyond the inner faces of the ends or head portions, as plainly indicated by dotted lines in Fig. 3.

In securing fish-plates to rails by means of my improved bolts and nut-strap the former are passed through the apertures in the fish-plates and rail and brought into engagement with the apertures in the ends of the strap. The bolts being turned by means of a wrench, the strap ends are drawn into contact with the fish-plate, the body portion F of the strap being partially straightened and brought to a tension by this operation. The lugs H H are now turned over by the blow of a hammer, so as to be brought into engagement with one of the recesses in the outer face of the end of the strap, thereby preventing the nut from being rotated.

The lugs H H are used as an extra precaution against the loosening of the bolts or may be dispensed with, for the reason that the tension of the elastic body portion will prevent the turning of the bolts by reason of the increased friction of the inner faces of the heads of the bolts against the fish-plate, the increased friction between the threads of the nut-straps and the bolts, and because the strain due to the elasticity of the bowed body portion of the strap is oblique to the bolt and consequently locks the nut-strap and bolt together by a bite action.

I am aware that a straight nut-strap having a plurality of threaded apertures has been used and do not broadly claim this construction.

Having thus described my invention, what I claim as new, and desire to secure by Letters Patent, is—

1. As an article of manufacture, a nut-strap comprising a pair of heads having threaded apertures, and an elastic body uniting the heads and being normally bowed so that its middle portion extends beyond the plane of one of the apertured faces of the heads.

2. The combination with a pair of screwbolts, of a nut-strap comprising a pair of heads having threaded apertures, and an elastic body uniting the heads and being normally bowed so that its middle portion extends beyond the plane of one of the apertured faces of the heads.

3. The combination with a pair of threaded bolts each having a lug projecting longitudinally from its threaded end, of a nut-strap having its ends apertured to receive the bolts and having radial recesses at the outer ends of such apertures into which the bolt-lugs may be forced, the body portion of the strap being elastic and being normally bowed so as to project beyond the inner faces of the apertured ends.

JOSEPH J. HARRELL.

Witnesses:
LOUIS K. GILLSON,
HESTER B. BAIRD.